Aug. 18, 1959          E. E. AYLOR          2,900,482
                         BROILER
Filed Nov. 4, 1957                     3 Sheets-Sheet 1

INVENTOR.
ELMO E. AYLOR
BY *J. V. Douglas*
   *his atty.*

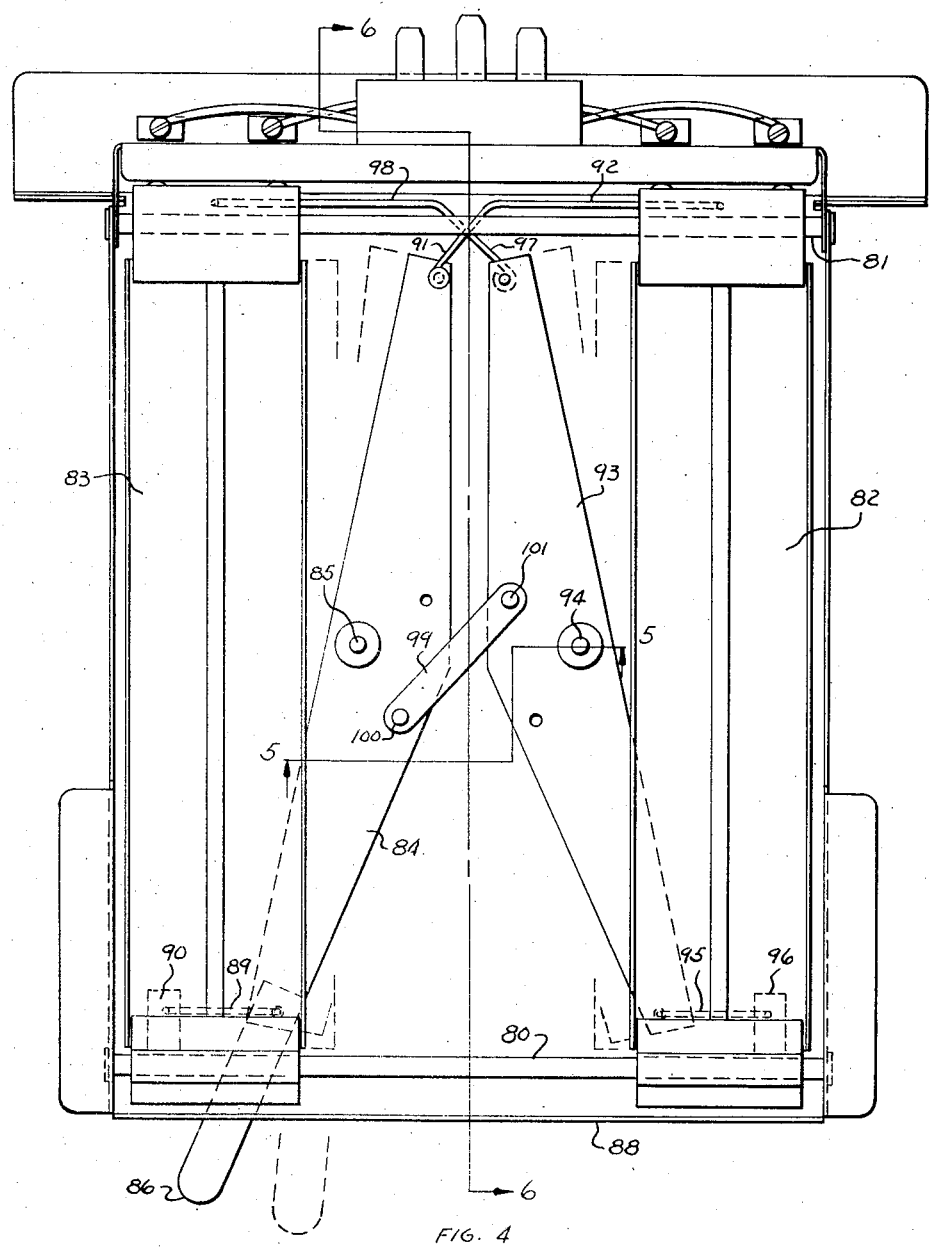
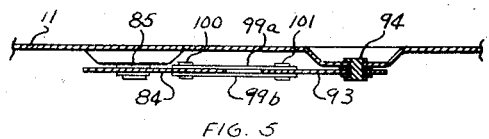
FIG. 4
FIG. 5
INVENTOR.
ELMO E. AYLOR
BY

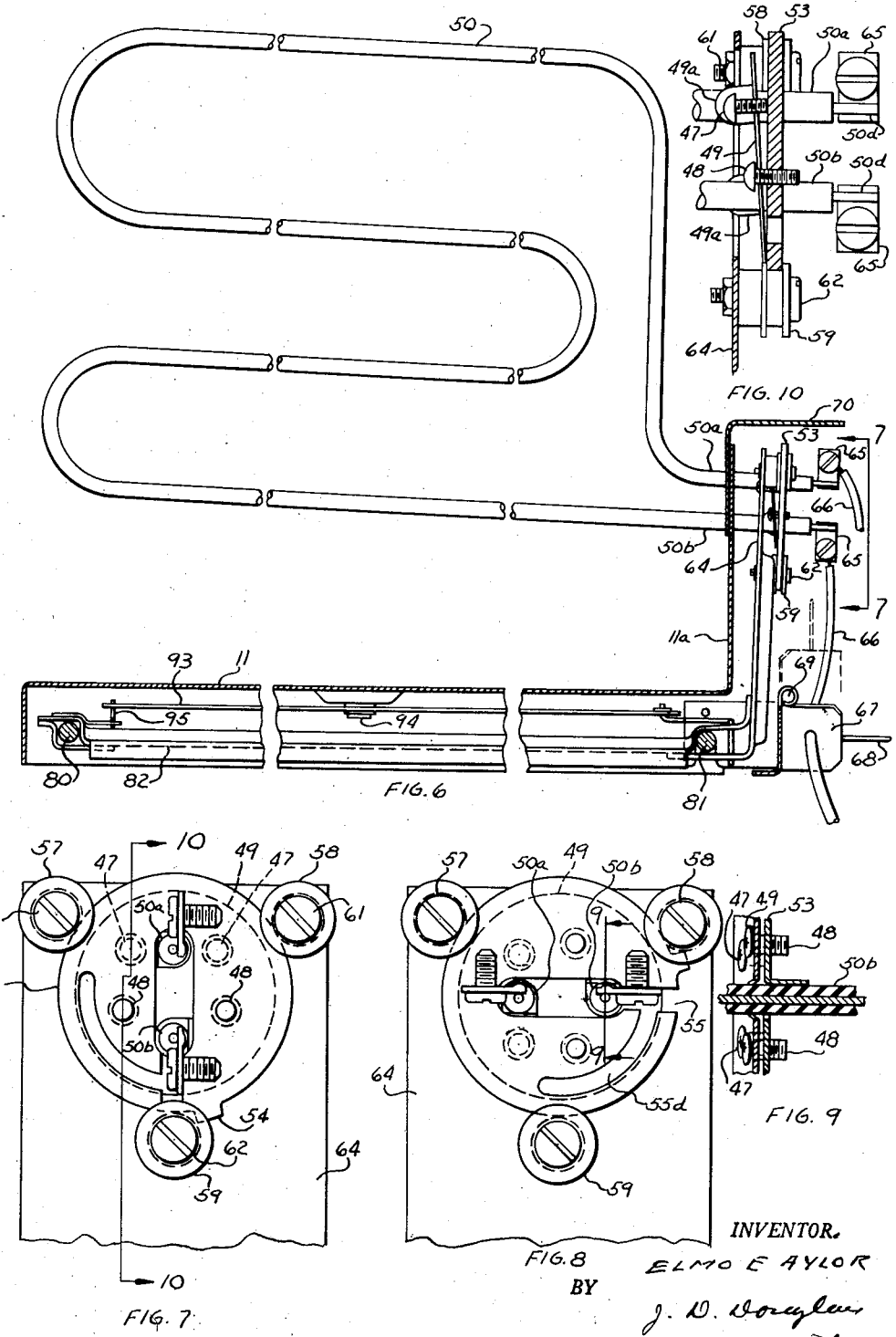

United States Patent Office 2,900,482
Patented Aug. 18, 1959

2,900,482
BROILER

Elmo E. Aylor, Woodland Hills, Calif., assignor to Midwest Manufacturing Corporation, Galesburg, Ill., a corporation of Illinois Application November 4, 1957, Serial No. 694,212

19 Claims. (Cl. 219—35)

This invention relates generally to an electric broiler and is directed particularly to such a broiler which is adapted for use in an electric cooking range.

The present broiler is characterized by the provision of two heating units arranged to be disposed vertically on opposite sides of the meat or other food to be broiled. When so positioned vertically, the heating units may be conveniently and readily adjusted toward or away from the food between them so as to achieve the desired cooking effect. Thus, for example, at the start of a broiling operation the meat first may be seared by positioning the heating units close, after which the heating units may be moved farther apart so as to finish cooking the meat more slowly. When not in use, the heating units may be retracted to substantially horizontal positions in which one overlies the other, rendering the broiler assembly extremely compact in size and easy to handle. The construction of the broiler makes it suitable for use as an accessory which may be readily inserted into and removed from the oven compartment of an electric range, or for use as a permanent part of the range.

While the foregoing are considered to constitute the primary characteristics of the present invention, other characteristics, advantages and objectives of the invention will be apparent from the following detailed description of a preferred embodiment of the invention, which is illustrated in the accompanying drawings.

In the drawings:

Figure 4 is a bottom view of the broiler, showing the manually-operable linkage by which the heating units may be adjusted toward or away from each other;

Figure 5 is a section taken along the line 5—5 in Fig 4;

Figure 6 is a section taken along the line 6—6 in Fig. 4 centrally along the base of the broiler and showing one of the heating units in vertical elevation;

Fig. 7 is a fragmentary back end view taken from a plane indicated by the line 7—7 of Fig. 6 showing the rotatable support for one of the heating units in the position in which it supports the heating unit vertically;

Figure 8 is a view similar to Fig. 7 and showing the parts positioned when the heating unit is horizontal;

Figure 9 is a section taken along the line 9—9 in Fig. 8 and showing details of the support for one of the heating elements; and Figure 10 is a section taken along the line 10—10 in Fig. 7.

Figure 1:
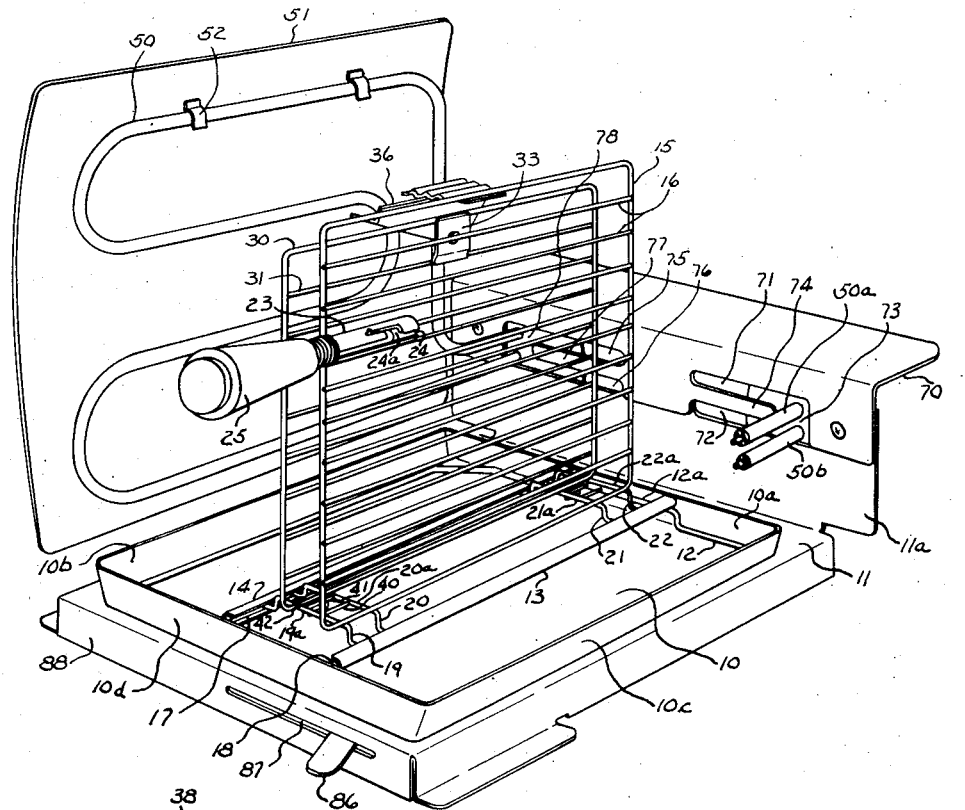
Figure 1 is front perspective view of the present broiler, with most of one of the heating units removed for clarity.
Figure 2:
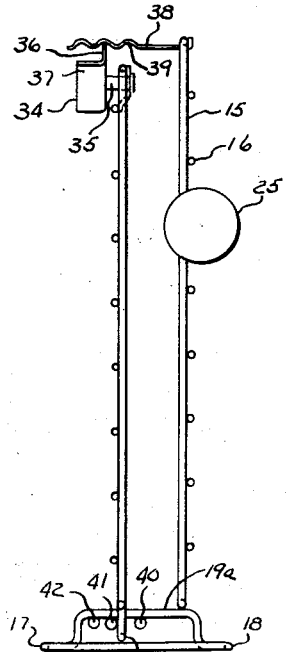
Figure 2 is a front end view of the grill arrangement in the broiler.
Figure 3:
Figure 3 shows the removable handle member for the grill of Fig. 2.

Referring first to Figs. 1–3, in conjunction with the present broiler there is provided a grill arrangement by means of which the food to be broiled is supported vertically between the heating units of the broiler.

This grill arrangement comprises a pan 10 supported horizontally by the base 11 of the present broiler. A wire support member 12 is seated on the bottom of the pan and snugly engages the upstanding back 10a, sides 10b and 10c, and front 10d of the pan. At the middle of its front and back ends the wire support member 12 presents upwardly offset, horizontal segments 12a which are disposed a short distance above the bottom of the pan. Rigid elongated channels 13 and 14 are attached at their opposite ends to these offset segments 12a. The channels extend in spaced, parallel relationship to one another from the front of the wire support member 12 to the back and are open at their confronting inner sides.

A first upstanding side of the grill is composed of a rectangular marginal frame 15 and spaced horizontal cross-pieces 16. At its lower end the frame 15 is rigidly connected to a support which is received and supported by the channels 13 and 14. This support (Fig. 2) comprises an open rectangular frame having spaced sides 17 and 18 which are slidably received in the channels 14 and 13, respectively. The sides 17 and 18 of the support are interconnected near the front and back by pairs of cross-pieces 19, 20 and 21, 22 which present upwardly offset, horizontal mid-portions 19a—22a to which the lower end of the frame 15 is rigidly secured, such as by welding. The mid-portions 19a and 20a of the front pair of cross-pieces 19 and 20 are interconnected by three spaced bars 40, 41 and 42, which are spaced at preselected distances from the side of the base. An identical arrangement of similarly located connecting bars 40—42 is provided at the mid-portions 21a and 22a of the back pair of cross-pieces 21 and 22.

A detachable handle assembly is provided for the first upstanding side of the grill. This handle assembly includes a tube 23 rigidly secured to the front of the frame 15 and to one of the cross-pieces 16. The tube 23 extends horizontally along the outside of this side of the grill and at its front end terminates substantially flush with the front of the frame 15 of this side. The tube 23 is formed with a bayonet slot 24 open at its front end.

The detachable part of the handle assembly comprises a handle member 25 having an elongated stem 26 shaped and dimensioned to be received in the lengthwise bore in the sleeve. The stem carries a transverse protrusion 27 toward its rear end for cooperation with the bayonet slot 24 in the tube 23. A collar 28 is slidably disposed on the stem 26. A coil spring 29 encircles the stem 26 forwardly of the collar 28. At its forward end the spring 29 is secured to the stem 26, while its rear end is positioned to be engaged by the slidable collar 28.

The detachable handle member 25 may be connected to the tube 23 by inserting its stem 26 into the front end of the bore in the tube, with its transverse protrusion 27 riding along the main portion of the bayonet slot 24 in the tube. The slidable collar 28 on the stem engages the front end of the tube and is forced forward along the stem 26 as the handle member 25 is inserted into the tube. Such sliding movement of the collar 28 causes the spring 29 to become compressed. When the handle member 25 has been inserted into the tube 23 a sufficient amount to position its transverse protrusion 27 at the transverse portion 24a of the bayonet slot, the handle member 25 is turned and then released. The compressed spring 29 moves the handle member 25 forward until the protrusion 27 engages the closed forward end of the bayonet slot as shown in Fig. 1. In this position of the parts, the handle member 25 is locked in the tube 23 and is thereby attached to the first upstanding side 15, 16 of the grill.

The second upstanding side of the grill is in the form of a rectangular marginal frame 30 and spaced horizontal cross-pieces 31. Attached to the bottom rail of the frame 30 are a pair of depending U-shaped feet 32 for engagement against the bars 40, 41 or 42 on the support for the first upstanding side, depending upon the spacing desired between the upstanding sides.

At the upper end of the second side a plate 33 is attached to the top rail of frame 30 and the uppermost cross-piece 31. An angle member 34 is pivotally mounted on the plate 33 by means of a horizontal pin 35. This angle member 34 is composed of a vertical truncated triangular segment 36 and an outwardly protruding transverse lip 37 connected to the lower end of segment 36.

A resilient locking member 38 is attached at one end to the top rail of the frame 15 of the first upstanding side of the grill. This locking member overlies the top of the second side of the grill and presents three spaced, downwardly facing recesses 39 for selectively receiving the top edge of the vertical segment 36 of the angle member 34, depending upon which of the bars 40—42 are engaged by the depending feet 32 on the second side. Thus, for example, when the depending feet 32 on the second side 30, 31 abut against the innermost bars 40 on the support for the first side 15, 16, the top edge of the vertical segment 36 of the angle member 34 carried by the second side is received in the innermost recess 30 on locking member 38.

In the assembly of this grill arrangement, initially the wire support member 12 and the channels 13, 14 which it supports are outside of the pan 10. The sides 17 and 18 of the support for the first upstanding side 15, 16 of the grill are inserted into the front ends of the channels 14 and 13 and are slid lengthwise thereon until this support is completely disposed between these channels. The detachable handle member 25 is mounted on the first side of the grill as already described. The wire support member 12 then is inserted down into the pan, with the support for the first side of the grill supported by the channels 13 and 14 and this first side of the grill extending up from the pan.

Following this, the second side 30, 31 of the grill is positioned with the bottom rail of its frame 30 resting on the upwardly offset horizontal portions 19a—22a of the cross-pieces on the support for the first side and with its depending feet 32 abutting against the stop bars 40, 41 or 42 on the base which correspond to the spacing desired between the first and second sides of the grill. Then the angle member 34 is positioned with the top edge of its vertical segment 36 in engagement with the corresponding downwardly facing recess 39 on the locking member 38 carried by the first side of the frame. This locks the second side 30, 31 in spaced parallel relationship with respect to the first side 15, 16.

In the use of the foregoing grill arrangement, the heating units of the broiler are disposed vertically on opposite sides of the grill, one such heating unit being shown in Fig. 1 in its vertical position. Each heating unit comprises an elongated heating element 50 of serpentine configuration and a reflector plate 51 clipped onto the heating element by means of clips 52.

The opposite ends 50a and 50b of each heating element extend in closely spaced, parallel relationship to each other and are physically supported by a support member (Figs. 6–8) rotatably mounted behind the upstanding rear wall 11a of the base 11 of the broiler. Each support member includes a flat disc 53, having a periphery which is circular except for an outwardly protruding lug 54. A radial slot 55 extends inwardly from one side of the lug past the center of the disc. It also connects with a circumferentially extending slot 55d to form a semi-circular tongue which provides a resilient peripheral mounting.

The support 53 in turn supports a disc 49 which has a pair of lugs 49a stamped therefrom, the lugs being welded or clamped to the parts 50a and 50b of the heat element to thereby support the heat element, the parts 50a and 50b of which extend through the enlarged center portion of the slot 55. The disc 49 is secured to the disc 53 by screws 48 which extend through holes in the disc 49 and are threaded into the disc 53. Additional screws 47 are in threaded engagement with the disc 49 and abut the disc 53. Thus the screws 47 and 48 may be adjusted to tilt the element up or down from the position as viewed in Fig. 6.

Each support member 53 is rotatably supported by three spaced circular bearing members 57, 58 and 59 having peripheral grooves which receive the peripheral edge of the support member 53. The bearing members 57—59 are carried by screws 60—62, respectively, which are mounted on an upstanding plate 64, there being two such plates 64, one for each rotatable support member 53.

When the heating element 50 is vertical, one of its ends 50a is disposed vertically above the other end 50b. In the case of the left-hand heating element shown in Figs. 1 and 6, in this vertical position of the heating element its support member 53 is positioned as shown in Fig. 7, with its lug 54 abutting against the lowermost bearing member 59. From this vertical position, the left-hand heating element may be retracted down to a horizontal position by exerting a force on it clockwise in Fig. 1. When this force is exerted the support member 53 for this heating element turns to the position shown in Fig. 8, where its lug 54 engages the bearing member 58. In this position, the opposite ends 50a and 50b are spaced apart horizontally and the entire heating unit 50 lies horizontal. The semi-circular tongue provides a degree of resiliency for the support, since it may give slightly in contact with the bearing 59.

The rotatable support for the right-hand heating element is essentially the same, except that the parts are reversed, so that the heating element is moved from its vertical position counter-clockwise in Fig. 1 to its horizontal position.

Referring to Fig. 6, the ends of each heating element support electrical terminals 65, which are welded to the ends of the wires. These terminals are connected by insulated wires 66 that extend down to and are connected to terminal prongs 68 of an insulation block 67. The prongs may be inserted into a suitable socket at the back of the oven compartment in the range. The insulation block is mounted on a hinge 69 supported by the base 11 which permits the block to be adjusted between the dotted line position in Fig. 6, in which the prongs 68 extend up from the block, for storage purposes, to the full line position, when it is in use, at which time the prongs extend horizontally back from the block. This hinge construction also permits easier insertion of the unit in the oven since the contact prongs can swivel slightly during insertion or even be tilted to permit the unit to be held in an angular position during insertion and relieve all strain on the block during the insertion process.

Referring now to Figs. 1, 4 and 6, a plate 70 is attached to the front face of the upstanding back wall 11a integral with the base 11. Together with the back wall, at one side of the centerline of the base it defines a pair of upper and lower horizontal elongated slots 71 and 72 which terminate at their outer ends in a larger open portion 73. Laterally inward from the open portion 73 the slots 71 and 72 are separated by an intervening wall segment 74 of the plate member 70. At the opposite side of the centerline of the base, the plate 70 and the back wall 11a of the base define a similar pair of upper and lower slots 75 and 76, which are separated by an intervening wall segment 77 of the plate 70 and at their outer ends terminate in a large open portion 78. The respective segments 74 and 77 are narrower than the spacing between the ends 50a and 50b of the heating elements.

The end openings 73 and 78 are sufficiently large to permit the respective heating elements to be turned from their vertical to their horizontal positions when the ends 50a and 50b of the heating elements are disposed in these end openings. When either heating element is horizontal, its ends 50a and 50b are in line horizontally with the corresponding segment 74 and 77 of the plate member 70. Therefore, the heating elements cannot be moved toward each other when horizontal.

However, when the heating elements are vertical, the upper end 50a of each heating element is aligned horizontally with the upper slot 71 or 75 and the lower end 50b of each heating element is aligned with the corresponding lower slot 72 or 76. Accordingly, the heating elements may be moved toward each other along these slots.

The present invention incorporates a manually operable linkage for selectively positioning the heating elements toward or away from each other. To this end, referring to Figs. 4 and 6, the depending sides of the base 11 carry rods 80 and 81 which extend from one side to the other adjacent the front end back of the base, respectively. Slides 82 and 83 at opposite sides of the base are slidably mounted on these rods for movement toward and away from each other. The upstanding plates 64 which carry the respective heating elements are rigidly attached to the back ends of these slides and form extensions of the slides.

A first linkage plate 84 is pivotally mounted at 85 on the base at one side of the centerline of the base. A handle 86 is rigidly attached to the front end of linkage plate 84 and extends out through an elongated horizontal slot 87 (Fig. 1) formed in the depending front flange 88 on base 11. Toward its front end the linkage plate 84 has a pivotal connection to one end of a short rigid wire link 89, which at its opposite end has a pivotal connection to a plate 90 attached to the front end of the slide 83. At its back end the linkage plate 84 has a pivotal connection to the angularly offset leg 91 of an elongated rigid wire link 92, which has its opposite end pivotally connected to the back end of the slide 82.

A second linkage plate 93 is pivotally mounted at 94 at the opposite side of the centerline of the base. At its front end the linkage plate 93 has a pivotal connection to one end of a short rigid wire link 95, which has its opposite end pivotally connected to a plate 96 attached to the front end of the slide 82. At its back end the second linkage plate 93 has a pivotal connection to the angularly offset leg 97 of an elongated rigid wire link 98, which at its opposite end is pivotally connected to the back end of the slide 83.

A pair of upper and lower connecting link members 99a and 99b have a pivotal connection at 100 to the first linkage plate 84 forward and inward of the latter's pivotal mounting on the base 11. At their opposite ends the link members 99a and 99b are connected at 101 pivotally to the second linkage plate 93 at a location thereon rearward and inward of the latter's pivotal mounting on the base 11.

With this linkage arrangement, when the handle 86 is at the right end of the slot 87 in Fig. 1, the slides 82 and 83 and the heating elements 50 which they carry are in their laterally outermost positions. When the handle 86 is displaced to the left in Fig. 1, the described linkage arrangement causes the slides 82 and 83 to be displaced toward each other, carrying with them the respective heating elements. Therefore, by manipulating a single handle it is possible to selectively determine the spacing between the heating elements on opposite sides of the grill assembly when the heating elements are upright.

In the use of the broiler, after the grill has been assembled as described to the position shown in Fig. 1, the vertically disposed heating units may be positioned toward or away from the grill simply by moving the handle 86 to the left or to the right. For example, if one desires to sear the meat first, the handle should be moved to the left in Fig. 1 to bring the heating units close to the grill. Later on, the handle may be moved to the right to move the heating units away from the grill to broil the meat more slowly.

When the broiler is not in use, the grill is disassembled and the handle 86 is moved to its extreme right-hand position along the slot 87. This positions the vertically disposed heating units at their extreme outermost positions, with the ends 50a and 50b of the respective heating elements being disposed in the large openings 73 and 78 at the back of the base. The heating units now may be retracted, one after the other, down to horizontal positions by exerting a clockwise force on the upper end of the left-hand heating unit and a counter-clockwise force on the upper end of the right-hand heating unit. This leaves the heating units disposed horizontally, one above the other. This renders the entire broiler assembly quite compact. It may be removed from the oven compartment of the range for storage elsewhere or it might be left in the oven when not in use. It is also contemplated that in the lowered position the heating elements may be energized for ordinary baking purposes.

From the foregoing, it will be apparent that the illustrated embodiment of the present broiler is quite convenient and flexible in use, and may readily be set up for use or "knocked down" into a compact unit when not in use.

While there has been described herein and illustrated in the accompanying drawing a specific presently preferred embodiment of the present invention, it is to be understood that various modifications, omissions and refinements which depart from the disclosed embodiment may be adopted without departing from the spirit and scope of this invention.

I claim:
1. A broiler comprising a base, a pair of slides mounted on the base for movement laterally along the base toward and away from each other, a pair of support members having individual connections to the respective slides to be carried thereby laterally of the base toward and away from each other, a pair of electrical heating units carried individually by said support members above the base and mounted to be positioned upright opposite one another, a single movable operating handle projecting from the base, linkage means pivotally mounted on the base and connected between said handle and the slides for moving the slides simultaneously toward or away from each other to carry the upright heating units toward or away from each other when the handle is moved, and said support members being rotatably supported from the slides to be turned from positions in which they support the heating units upright to positions in which they support the heating units substantially horizontal overlying one another.

2. The broiler of claim 1, wherein there is provided means on the base restraining the heating units against being moved to their substantially horizontal positions except when said support members are positioned laterally outward on the base.

3. A broiler comprising a horizontal base and a back wall extending up from the rear of the base, a pair of slides mounted slidably below the base for movement laterally of the base toward and away from each other, each slide carrying a rear extension which extends up behind said back wall, a pair of support members mounted individually on said extensions behind said back wall to be carried by the slides laterally of the base toward and away from each other, said back wall having openings therein opposite said support members, a pair of electrical heating units connected to said support members and extending forward therefrom through said openings in the back wall and presenting heating portions forward of said back wall which overlie the horizontal base, said support members being mounted to support the heating units with their heating portions upright opposite each other, and manually operable means coupled to said slides for moving the slides laterally of the base to move the upright heating portions of the heating units laterally of the base toward or away from each other.

4. The broiler of claim 3, wherein said manually operable means comprises linkage means pivotally mounted at the underside of said horizontal base and having pivotal connections to the slides, and a single movable handle which extends from the base and is coupled to said linkage means.

5. The broiler of claim 4, wherein said base has a depending front wall with an elongated horizontal slot therein which extends laterally across the base, and said handle projects through said slot and is movable along the slot laterally across the base to operate said linkage means to move the slides.

6. A broiler comprising a horizontal base and a back wall extending up from the rear of the base, a pair of slides mounted slidably below the base for movement laterally of the base toward and away from each other, each slide carrying a rear extension which extends up behind said back wall, a pair of support members mounted individually on said extensions behind said back wall to be carried by the slides laterally of the base toward and away from each other, said back wall having openings therein opposite said support members, a pair of electrical heating units connected to said support members and extending forward therefrom through said openings in the back wall and presenting heating portions forward of said back wall which overlie the horizontal base, said support members being mounted to support the heating units with their heating portions upright opposite each other, manually operable means coupled to said slides for moving the slides laterally of the base to move the upright heating portions of the heating units laterally of the base toward or away from each other, and each of said support members being mounted to be turned about a horizontal axis to retract the heating units from their upright positions down to substantially horizontal positions overlying one another above the horizontal base.

7. The broiler of claim 6, wherein each extension carries a plurality of spaced bearing members having peripheral grooves therein, and each support member has a substantially circular periphery engaged in said grooves and a lug which protrudes from its periphery to engage the bearing members and thereby limit the extent to which the support member can be turned in either direction.

8. The broiler of claim 6, wherein said back wall presents portions which prevent the heating units from being retracted from their upright positions down to their substantially horizontal positions except when the slides and support members are positioned laterally outward on the base.

9. The broiler of claim 8, wherein each of said openings in the back wall comprises a large open portion and a pair of vertically spaced slots which extend horizontally from said open portion laterally inward with respect to the base, said back wall presenting an intervening wall portion between each pair of slots, each heating unit comprises a heating element having spaced ends which project through said openings in the back wall, with the respective ends being aligned with said slots when the heating unit is upright, and said large open portions of the openings are dimensioned to permit the ends of the heating elements to turn therein freely as the respective support members are turned when the heating units are disposed laterally outward on the base.

10. A broiler comprising a horizontal base and a back wall extending up from the rear of the base, a pair of slides slidably mounted below the horizontal base for movement laterally of the base toward and away from each other, each slide carrying a rear extension which extends up behind said back wall, each of said extensions carrying a plurality of spaced bearing members having peripheral grooves therein, a pair of support members mounted respectively on said extensions behind said back wall to be carried by said slides and to be turned about a horizontal axis, each support member having a substantially circular periphery engaged in said grooves in the bearing members and a lug which protrudes from its periphery to engage the bearing members and thereby limit the extent to which the support member can be turned in either direction, said back wall having openings therein opposite said support members, a pair of electrical heating elements connected to said support members and having spaced ends which project forward through said openings, each heating element presenting a heating portion forward of said back wall and overlying the horizontal base, each of said openings in the back wall comprising a large open portion and a pair of vertically spaced slots which extend horizontally from said open portion laterally inward with respect to the base, said large open portions being dimensioned to permit the ends of the heating elements to turn therein freely as the respective support members are turned when the heating units are disposed laterally outward on the base, said slots being aligned with the respective ends of the heating elements when the latter are upright, and said back wall presenting an intervening wall portion between the slots of each pair which prevents the heating elements from being turned from their upright positions when their ends are disposed in said slots, linkage means pivotally mounted at the underside of the horizontal base and having pivotal connections to the slides, said base having a depending front wall with an elongated horizontal slot therein, and a handle projecting through said slot and coupled to said linkage means to operate the latter to move the slides laterally on the base toward or away from each other as the handle is moved along said slot, each of said support members being turnable to retract the heating elements from their upright positions down to substantially horizontal positions overlying one another above the horizontal base when the heating elements are disposed laterally outward on the base with their respective ends received in said large open portions of the openings in the back wall.

11. A support member for an electrically operated broiler element wherein the element is supported for rotation from a vertical to a horizontal position or vice versa comprising a main support, a plurality of guide members carried by the main support, a disc rotatably carried in said guide members, a heating element support adjustably carried by said disc and a heating element secured thereto.

12. A device as described in claim 11 wherein the disc is provided with a slot defining a peripherally extending resilient tongue arranged to be engaged by one of said guide members.

13. A vertical broiler having broiler elements which may be rotated from a vertical to a horizontal position including a base, a vertical wall extending upwardly at one end of the base, and having an opening therein, a support disposed behind said wall and having an opening in alignment with said first opening, guide means disposed at circumferentially spaced points around said second opening and a first heater support means rotatably carried thereby, a second heater support means adjustably carried by the first heater support means and heater means carried by said second means.

14. A broiler device including a base, support means at one end of the base, spaced guide members on said support means each having a peripherally channeled portion, a disc rotatably disposed in said channeled portions of the guide members, a heater support element having a heater element rigidly connected thereto and extending outwardly therefrom, adjustable means connecting said heater support element to said disc and arranged to vary the spacing of said heater support element at one edge from the disc at the adjacent edge whereby the position of the heater element may be adjusted.

15. A device as described in claim 14 wherein the the disc is provided with an opening and the heater element has portions extending through the opening and connection leads are connected to said portions beyond the disc.

16. A device as described in claim 15 wherein a connector block is hingedly connected to said end of said base and has outwardly extending connector prongs connected to said leads.

17. A broiler comprising a base, a pair of heating units, support means supporting said heating units individually above the base to be positioned upright opposite one another, means for moving at least one of said heating units toward or away from the other heating unit to selectively determine the spacing between them, and said support means including means adjustably supporting the heating units to be turned from their respective upright positions opposite one another to positions in which one overlies the other.

18. A broiler comprising a base, a pair of heating units, support means supporting said heating units individually above the base to be positioned upright opposite one another, means for moving at least one of said heating units toward or away from the other heating unit to selectively determine the spacing between them, said support means including means rotatably supporting the heating units to be turned from their respective upright positions opposite one another to positions in which they extend substantially horizontal overlying one another, and means on the base restraining said one heating unit against being turned to its substantially horizontal position except when it is positioned a predetermined distance away from said other heating unit.

19. A broiler comprising a base, a pair of linkage plates extending from front to back on the base and pivoted on the base at separate pivots which are spaced apart laterally across the base, a link member pivotally connected to one of said linkage plates forward of the latter's pivot on the base and pivotally connected to the other linkage plate rearward of the latter's pivot on the base, a handle connected to one of said linkage plates and projecting beyond the front of the base and mounted for movement laterally across the front of the base, a pair of slides connected respectively to the linkage plates rearward of the latter's pivots on the base, means guiding said slides for movement laterally across the base toward or away from each other when said handle is displaced laterally of the base to turn the linkage plates about their respective pivots, and heating elements disposed above the base and supported from said slides for movement laterally across the base toward or away from each other.

References Cited in the file of this patent

UNITED STATES PATENTS

| | | |
|---|---|---|
| 1,398,157 | Segar | Nov. 22, 1921 |
| 1,485,193 | McKay | Feb. 26, 1924 |
| 1,586,738 | Guy-Pell | June 1, 1926 |
| 1,667,988 | Richardson | May 1, 1928 |
| 1,713,303 | Serrell | May 14, 1929 |
| 1,831,820 | Noble | Nov. 17, 1931 |
| 2,314,772 | Corra | Mar. 23, 1943 |
| 2,478,253 | Doner | Aug. 9, 1949 |
| 2,848,592 | Mergen | Aug. 19, 1958 |
| 2,851,575 | Walston et al. | Sept. 9, 1958 |

FOREIGN PATENTS

| | | |
|---|---|---|
| 330,604 | Great Britain | June 13, 1930 |
| 504,640 | Great Britain | Apr. 28, 1939 |
| 658,303 | Germany | Mar. 25, 1938 |